United States Patent [19]

Johnston

[11] Patent Number: 5,039,281

[45] Date of Patent: Aug. 13, 1991

[54] METHOD AND APPARATUS FOR SUPPLYING COMPRESSED AIR TO AUXILIARY SYSTEMS OF A VEHICLE

[75] Inventor: Richard P. Johnston, Morrow, Ohio

[73] Assignee: General Electric Company, Cincinnati, Ohio

[21] Appl. No.: 457,028

[22] Filed: Dec. 26, 1989

[51] Int. Cl.⁵ ............................................. F04B 39/04
[52] U.S. Cl. ...................................... 417/212; 475/2; 475/5; 60/39.33
[58] Field of Search ................... 417/212; 475/2, 5, 9; 60/39.142, 39.15, 39.2, 39.33

[56] References Cited

U.S. PATENT DOCUMENTS

| | | |
|---|---|---|
| 2,276,794 | 3/1942 | Ricci ................................... 417/212 |
| 2,297,237 | 9/1942 | Nallinger ........................ 417/212 X |
| 2,728,246 | 12/1955 | Korkosz . |
| 2,771,791 | 11/1956 | Bachman . |
| 2,908,189 | 10/1959 | Parker et al. . |
| 2,924,991 | 2/1960 | Whiting . |
| 3,260,133 | 7/1966 | Mattson . |
| 3,298,251 | 1/1967 | Moss . |
| 3,307,426 | 3/1967 | Whitaker . |
| 3,514,945 | 6/1970 | Austin . |
| 3,525,273 | 8/1970 | Brownstein . |
| 3,577,965 | 5/1971 | Sundlerg ....................... 417/212 X |
| 3,596,524 | 8/1971 | Cook . |
| 4,542,722 | 9/1985 | Reynolds ..................... 60/39.142 X |
| 4,854,190 | 8/1989 | Won ..................................... 475/9 X |

Primary Examiner—John C. Fox
Attorney, Agent, or Firm—Jerome C. Squillaro

[57] ABSTRACT

An apparatus for supplying compressed air to the auxiliary system of a vehicle such as an aircraft, or other device powered by a gas turbine engine, comprises an auxiliary compressor which is connected by a differential to the main drive shaft of the compressor of the gas turbine engine. A controller receives a signal from a pressure sensor at the output of the auxiliary compressor representing the pressure and/or flow rate of the compressed air discharged from the auxiliary compressor and compares that signal with a signal from the auxiliary system representing its requirements for compressed air which can be set at predetermined levels or dynamically determined during operation of the vehicle. The controller is effective to control a variable speed motor connected to the differential which speeds up or slows down the auxiliary compressor and thus varies the compressed air output from the auxiliary compressor to the auxiliary system of the vehicle.

10 Claims, 1 Drawing Sheet

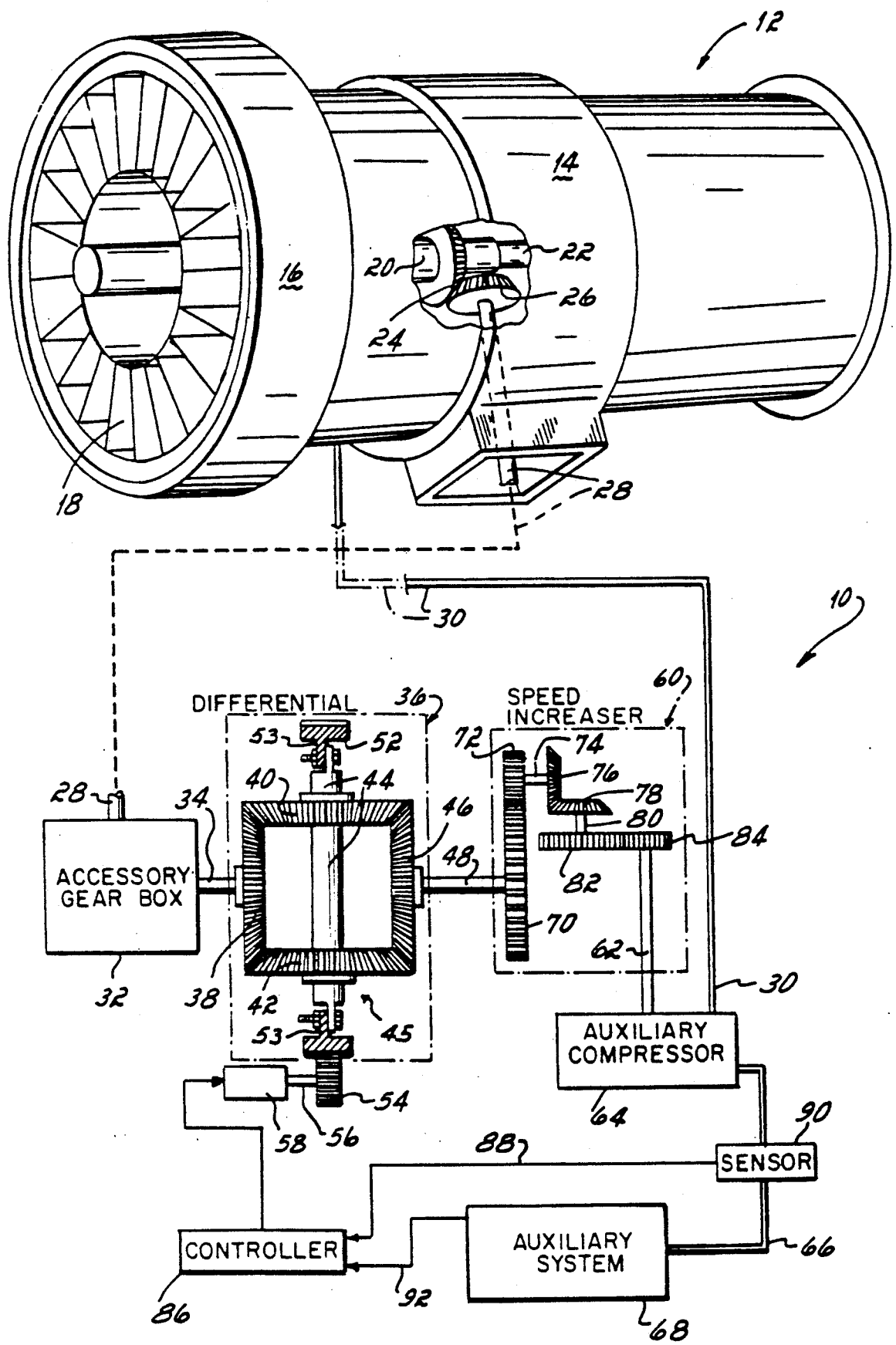

METHOD AND APPARATUS FOR SUPPLYING COMPRESSED AIR TO AUXILIARY SYSTEMS OF A VEHICLE

FIELD OF THE INVENTION

This invention relates to compressed air supplies for auxiliary systems, and, more particularly, to a method and apparatus for supplying compressed air at predetermined pressure or flow levels to auxiliary systems associated with vehicles or other devices driven by gas turbine engines such as commercial aircraft.

BACKGROUND OF THE INVENTION

Vehicles such as aircraft have a number of auxiliary systems which require the supply of compressed air such as environmental control systems which control cabin pressurization and air conditioning. In the prior art, the supply of compressed air for auxiliary systems in aircraft usually has been obtained from the main engine compressor wherein bleed ports are strategically located at one or more stages of the compressor. These bleed ports supply compressed air directly from the main engine compressor to the environmental control system and other auxiliary systems of the aircraft.

One disadvantage with the use of bleed ports is that the flow and pressure needs of the auxiliary systems often do not match the supply of compressed air available at the bleed ports located within the main engine compressor. This is due to variations in the pressure of the compressed air available as the power levels of the engine change during takeoff, cruising and landing, and/or because it is inconvenient or impossible to position a bleed, port at the appropriate compression stage within the main engine compressor to obtain a matched supply of compressed air for the auxiliary systems.

Even where bleed ports can be positioned at a compression stage within the main engine compressor which relatively closely matches the demand of the auxiliary systems, such matching is usually obtained only at certain altitudes. Often, there is a substantial waste of pressure work at normal cruising altitudes of the aircraft which becomes even worse as the aircraft flies lower. In addition, the pressure and flow rates of compressed air required by the auxiliary systems vary as the aircraft changes altitude and these variations often are not well matched to the power level and compression level operation of the aircraft engine. Generally speaking, the supply pressure of the compressed air from the main engine compressor to auxiliary systems of an aircraft is always higher than required. This leads to substantial inefficiency and lost pressure work.

One attempt in the prior art to solve some of the problems outlined above has been to provide an auxiliary compressor which is mechanically driven by the shaft of the compressor in the main engine. In these systems, a constant gear ratio arrangement has been employed in which the rotation of the main shaft of the engine compressor is directly transmitted to the auxiliary compressor to drive it at a proportional speed and produce compressed air for the auxiliary systems of the aircraft.

A problem with prior art systems employing an auxiliary compressor driven from the main engine at a constant gear ratio is that the mismatch problems between the supply and demand for compressed air are simply transferred from the main engine compressor to the auxiliary compressor. Design considerations dictate that the auxiliary compressor operating point and speed be set according to the worst operating point condition of the main compressor because of the constant gear ratio connection therebetween. Unfortunately, such settings are often far removed from the peak efficiency operating conditions of the auxiliary compressor. As a result, any advantages which could be theoretically obtained by using an auxiliary compressor to supply compressed air to the auxiliary systems instead of bleed ports in the main engine compressor are largely lost.

SUMMARY OF THE INVENTION

It is therefore among the objectives of this invention to provide a system for supplying compressed air to the auxiliary systems of vehicles such as aircraft which closely matches the pressure and flow demands of such auxiliary systems throughout the range of operation of the vehicle, which utilizes available supplies of compressed air from the vehicle engine, which is dependable in operation and which is relatively inexpensive.

These objectives are accomplished in a system for supplying compressed air to the auxiliary systems of a. gas turbine engine powered vehicle which employs an auxiliary compressor driven in part by the main drive shaft of the gas turbine engine and by a variable speed motor which either speeds up or slows down the output to the auxiliary compressor depending upon the pressure and flow of compressed air required by the auxiliary systems of the vehicle. The discharge of compressed air from the auxiliary compressor is constantly monitored by a pressure sensor which produces a signal received by a programmable controller. In the event the speed of the, main drive shaft of the engine is either more or less than that required to drive the auxiliary compressor to produce the desired output of compressed air, the programmable controller is operative to sense the signal from the pressure sensor and adjust the speed of the variable speed motor. In turn, the auxiliary compressor is driven so that the appropriate flow and pressure levels of compressed air discharged therefrom are obtained.

In the presently preferred embodiment, a gear box is drivingly connected to the main drive shaft of the compressor of a gas turbine engine such as employed in a jet aircraft. The gear box drives the input shaft which is connected to a differential comprising an input bevel gear, an output bevel gear and a spider gear assembly therebetween. The input bevel gear is mounted on the input shaft, and an output bevel gear is mounted to an output shaft which is coaxial with the input shaft. The spider gear assembly includes a pair of spider bevel gears connected at either end of a shaft, each of which mesh with both the input bevel gear and the output bevel gear. The spider bevel gears are effective to transmit the rotation of the input shaft through the input bevel gear to the output shaft through the output bevel gear so that the output shaft is driven at the same speed as the input shaft but in the reverse direction.

A spider gear drivingly connected to the variable speed control motor attaches to the shaft between the two spider bevel gears of the spider gear assembly. The control motor is operative to drive the spider gear, and, in turn, the shaft, so that the speed and direction of rotation of the spider bevel gears can be varied independently of the input shaft. As a result, the speed and direction of the output shaft is also variable independently of the input shaft.

In the presently preferred embodiment, the programmable controller also receives a signal from the environmental control system of the aircraft, or other auxiliary systems, corresponding to the flow rate and/or pressure demand for compressed air at a given point in time. In response to this signal, the programmable controller is operative to vary the speed of the control motor, which, in turn, varies the operating speed of the auxiliary compressor.

For example, if after comparing the signal from the pressure sensor with the signal from the auxiliary systems of the aircraft the programmable controller determines that the output of the auxiliary compressor is too low, the speed of the control motor is adjusted so that the auxiliary compressor is driven at a higher speed. On the other hand, if less flow and/or pressure of compressed air is required from the auxiliary compressor, the programmable controller operates the control motor to reduce the rotational speed of the output shaft from the differential and thus lessen the flow and/or pressure from the auxiliary compressor.

In the presently preferred embodiment, a speed increaser comprising a series of intermeshing gears is interposed between the output shaft of the differential and the auxiliary compressor to increase the rotational input to the auxiliary compressor, which, because of its relatively small size, operates at a higher rate of revolution than the compressor of the main engine. Depending upon the particular aircraft or other vehicle involved, the gear ratios of the differential and speed increaser are chosen such that for most of the vehicle's operation, the auxiliary compressor is driven primarily by the output from the main drive shaft of the compressor of the engine. For example, the gear ratio selection for the differential and speed increaser employed in an aircraft would be based upon the demand of the auxiliary systems such as the environmental control system of the aircraft at its nominal cruising speed and cruising altitude. During takeoff and landing of the aircraft, the variable speed drive motor would assist to either speed up or slow down the drive to the auxiliary compressor depending upon the demand for compressed air by the auxiliary systems of the aircraft. At cruising speed and altitude, however, little or no adjustment would be required of the variable speed motor.

DESCRIPTION OF THE DRAWINGS

The structure, operation and advantages of the presently preferred embodiment of this invention will become further apparent upon consideration of the following description, taken in conjunction with the accompanying drawings, wherein the FIGURE is a diagrammatic view of the gas turbine engine of an aircraft and the system for supplying compressed air to the auxiliary systems of an aircraft such as the environmental control system.

DETAILED DESCRIPTION OF THE INVENTION

Referring now to the FIGURE, the auxiliary compressed air supply system 10 of this invention is illustrated in association with a gas turbine engine 12 of the type employed, for example, in commercial aircraft. The details of the gas turbine engine 12 form no part of this invention per se and are thus described briefly herein. Engine 12 includes an engine case 14 which houses a compressor having an intake casing 16 surrounding a low pressure stage 18 of the compressor. The compressor is driven by a main drive shaft 20 which connects to a drive shaft 22 for the turbine (not shown) of the engine 12. A drive gear 24 is carried on the main drive shaft 20 which drivingly engages a follower gear 26 connected to an auxiliary drive shaft 28 extending out of the engine case 14. One or more bleed ports (not shown) are formed in the engine case 14 at one or more of the stages of the compressor through which compressed air from the compressor is directed into a supply line 30.

The system 10 of this invention is schematically illustrated in the lower half of the FIGURE. It is contemplated that the orientation of the components forming system 10 relative to the gas turbine engine 12 would be dependent upon the configuration of the particular vehicle involved. It is assumed, for purposes of discussion, that the system 10 is employed to provide compressed air for the auxiliary systems of a commercial aircraft such as the environmental control system. The system 10 would therefore be adapted to interface with the gas turbine engine 12 of an aircraft and would be oriented as dictated by space requirements and design criteria of a given aircraft. It should therefore be understood that the FIGURE is provided for purposes of illustration only and could be modified to accommodate the space and design requirements of a particular application.

The system 10 comprises an accessory gear box 32 which is drivingly connected to the auxiliary drive shaft 28 driven by the main drive shaft 20 of the engine compressor. The accessory gear box 32 drives an input shaft 34 which is connected to a differential 36. The differential 36 comprises an input bevel gear 38 mounted on the input shaft 34, an output bevel gear 46 mounted on an output shaft 48, and a spider gear assembly 45 therebetween. The spider gear assembly 45 includes upper and lower spider bevel gears 40 and 42 mounted by bearings (not shown) on opposite ends of a shaft 44 extending therebetween, and an annular spider drive gear 52 mounted to shaft 44 as described below. The input bevel gear 38 drivingly engages the upper and lower spider gears 40, 42, which, in turn, mesh with the output bevel gear 46. As a result, rotation of the input shaft 34 and input bevel gear 38 is transmitted through the upper and lower bevel gears 40, 42 of the spider gear assembly 45 to the output bevel gear 46. The output bevel gear 46 and output shaft 48 are thus driven at the same speed, but in the opposite direction, from that of input shaft 34 and input bevel gear 38 when the spider gear assembly 45 is fixed in space.

The shaft 44 interconnecting upper and lower spider bevel gears 40, 42 is drivingly connected to the annular spider drive gear 52 by clamps or flanges 53 which are secured by bolts to shaft 44. The spider drive gear 52 meshes with a pinion gear 54 on the output shaft 56 of a variable speed motor 58. As discussed in detail below, the variable speed motor 58, through pinion gear 54 and spider gear 52, is operative to control the speed of rotation of spider bevel gears 40, 42 and shaft 44, and therefore the speed of rotation of output bevel gear 46, independently of the input drive from the input shaft 34 and input bevel gear 38.

The output shaft 48 from the differential 36 is connected to a speed increaser 60 having an auxiliary drive shaft 62 which drives an auxiliary compressor 64. This auxiliary compressor 64 supplies compressed air through an output line 66 to one or more auxiliary systems such as the environmental control system of an aircraft or other vehicle illustrated schematically with the reference number 68 in the drawings. Preferably, the auxiliary compressor 64 receives pre-compressed air from the engine compressor through line 30.

In most cases, the speed of rotation of the compressor of the gas turbine engine 12 is less than that required to drive a smaller compressor such as the auxiliary compressor 64 illustrated in the FIGURE. The speed increaser 60 is therefore provided to increase the speed of the auxiliary drive shaft 62 in comparison to the speed of the output shaft 48 from the differential 36. The speed increaser 60 comprises a drive gear 70 mounted to the output shaft 48 from the differential 36 which is drivingly connected to a pinion gear 72 mounted on a shaft 74. The shaft 74 carries a first bevel gear 76 which is drivingly connected to a second bevel gear 78 mounted on a shaft 80. This shaft 80 drives a follower gear 82 which meshes with a driven gear 84 carried on the auxiliary drive shaft 62. The gear ratio of the gears forming the speed increaser 60 is chosen to increase the speed of rotation of the auxiliary drive shaft 62, compared to that of the output shaft 48, in order to drive the auxiliary compressor 64 at a predetermined rate according to the demands of the auxiliary system 68 of a particular vehicle.

An important feature of this invention is predicated upon the capability of the compressed air supply system 10 to vary the pressure and volume of compressed air delivered to the auxiliary system 68 in accordance with the requirements of such system. In an aircraft, for example, auxiliary systems such as the environmental control system have varying demands for compressed air depending upon the altitude of the aircraft, the volume of air required and a variety of other factors. In order to meet these varying demands for compressed air, the auxiliary compressor 64 must be driven so that the pressure and flow rate of the compressed air it discharges into the output line 66 for the auxiliary system 68 matches the demand.

This is accomplished in the instant invention by a variable drive system which controls the speed of rotation of the output shaft 48 from the differential 36. In the presently preferred embodiment, a programmable controller 86 is connected by a line 88 to the output of a pressure sensor 90 located in the output line 66 from the auxiliary compressor 64. The pressure sensor 90 is operative to sense the output pressure from the auxiliary compressor 64 and send a corresponding signal to the programmable controller 86.

Additionally, the programmable controller 86 is connected by a line 92 to the auxiliary system 68, e.g., the environmental control system of an aircraft. A signal is sent through line 92 to the programmable controller 86 representing the demand or requirement for compressed air at any given time during operation of the aircraft or other vehicle. It is contemplated that the signals received by the controller 86 from the auxiliary system 68 may be in accordance with a predetermined schedule, or such signals could be provided by sensors capable of dynamically indicating the compressed air demands of the auxiliary system 68 at any given point in time.

The programmable controller 86 is operative to compare the signal from the auxiliary system 68 indicating demand for compressed air with the signal from pressure sensor 90 indicating the output of auxiliary compressor 64 and make a determination whether the output of the auxiliary compressor 64 meets the demand for compressed air. The programmable controller 86 then sends a signal to the variable speed motor 58 to control the speed of its output shaft 56 accordingly. In turn, the variable speed motor 58 controls the speed of rotation of output shaft 48 of differential 36 through the interconnection of pinion gear 54, spider drive gear 52, spider bevel gears 40, 42 and the output bevel gear 46.

For example, if it is determined by the programmable controller 86 that the pressure and/or flow rate of the compressed air discharged from auxiliary compressor 64 is less than that required by the auxiliary system 68, then the controller 86 sends a signal to alter the speed of the motor 58 to increase the speed of rotation of the output shaft 48 from the differential 36, and thus increase the output from auxiliary compressor 64. On the other hand, if the pressure or flow rate of compressed air from the auxiliary compressor 64 to the auxiliary system 68 is greater than that required, the controller 86 is operative to alter the speed of motor 58 such that the speed of output shaft 48 is decreased.

Depending upon the particular vehicle and engine 12 involved, the gear ratios in the accessory gear box 32 and speed increaser 60 are chosen so that the motor 58 would not be required to significantly adjust the speed of rotation of output shaft 48 for much of the vehicle's operation. For example, during a normal flight, an aircraft would spend much of the flight at cruising altitude and cruising speed. Depending upon the engine size, cruising altitude and other factors, the gear ratios of the accessory gear box 32 and speed increaser 60 would be chosen so that the output shaft 48 of differential 36 would be essentially directly driven by the output from the accessory gear box 32 of the engine at cruising speed and cruising altitude.

During takeoff, landing, climb, descent or other "off-design" conditions, the motor 58 would have to be operated to either increase or decrease the speed of rotation of output shaft 48 to control the pressure level and flow rate of compressed air from the auxiliary compressor 64 as described above. In this manner, the auxiliary supply system 10 is operated efficiently with essentially no wasted pressure work by the auxiliary compressor 64. This decreases the specific fuel consumption of the engine, thus increasing economy.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, while the auxiliary compressed air supply system 10 has been discussed for use in connection with vehicles such as aircraft, it is contemplated that the system 10 could be employed in essentially any application in which a gas turbine engine is used as a prime mover and compressed air is required for any type of auxiliary system. Additionally, although a high speed centrifugal compressor has been discussed herein, the auxiliary compressor 64 could be a low speed positive displacement compressor.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for supplying compressed air to an auxiliary system associated with a device powered by a as turbine engine having a compressor with a main drive shaft, comprising:
   an input shaft and an output shaft;
   means adapted to connect to the main drive shaft of the compressor for driving said input shaft in a direction and at a speed corresponding to that of the main drive shaft;
   differential means for drivingly connecting said input shaft to said output shaft;
   variable drive means operatively connected to said differential means for varying the speed of rotation of said output shaft independently of said input shaft;
   an auxiliary compressor adapted to receive compressed air, said auxiliary compressor being drivingly connected to said output shaft and being effective to supply compressed air to said auxiliary system at a pressure and flow rate output corresponding to the speed of said output shaft;
   sensor means for sensing the output of compressed air supplied by said auxiliary compressor, said sensor means producing a signal corresponding to said output;
   control means for receiving said signal from said sensor means and controlling said variable drive means to alter the speed of said output shaft and thus vary the output of compressed air supplied by said auxiliary compressor in accordance with the demand for compressed air of said auxiliary system.

2. The apparatus of claim 1 in which said differental means comprises:
   an input bevel gear mounted to said input shaft;
   a connector shaft;
   a pair of opposed bevel gears mounted at each end of said connector shaft so that said opposed bevel gears mesh with said input bevel gear;
   an output bevel gear mounted to said output shaft in position to mesh with each of said opposed bevel gears, said opposed bevel gears being driven by said input bevel gear which then drive said output bevel gear;
   a drive gear drivingly engaging said connector shaft, said drive gear being drivingly connected to said variable drive means and being effective to rotate said opposed bevel gears on said connector shaft and said output bevel gear at variable speeds independently of said input bevel gear.

3. The apparatus of claim 2 in which said control means comprises:
   a programmable controller connected to said sensor means;
   a variable speed motor connected to said programmable controller, said programmable controller being effective to control the speed of the output of said variable speed motor in response to the signal received from said sensor means;
   a pinion gear mounted to the output of said variable speed motor and drivingly connected to said drive gear.

4. Apparatus for supplying compressed air to an auxiliary system associated with an aircraft powered by a gas turbine engine having a compressor with a main drive shaft, comprising:
   an input shaft and an output shaft;
   means adapted to connect to the main drive shaft of the compressor of the gas turbine engine for driving said input shaft in a direction and at a speed corresponding to that of the main drive shaft;
   differential means for drivingly connecting said input shaft to said output shaft;
   variable drive means operatively connected to said differential means for varying the speed of rotation of said output shaft independently of said input shaft;
   an auxiliary compressor adapted to receive compressed air from a stage of the compressor of the gas turbine engine of the aircraft, said auxiliary compressor being drivingly connected to said output shaft and being effective to supply compressed air to the auxiliary system of the aircraft at a pressure and flow rate output corresponding to the speed of said output shaft;
   sensor means for sensing the output of compressed air supplied by said auxiliary compressor, said sensor means producing a signal corresponding to said output;
   control means for receiving said signal from said sensor means and controlling said variable drive means to alter the speed of said output shaft and thus vary the output of compressed air supplied by said auxiliary compressor in accordance with the demand for compressed air of the auxiliary system during operation of the aircraft.

5. Apparatus for supplying compressed air to an auxiliary system associated with a device powered by a gas turbine engine having a compressor with a main drive shaft, comprising:
   an input shaft and an output shaft;
   means adapted to connect to the main drive shaft of the compressor for driving said input shaft in a direction and at a speed corresponding to that of the main drive shaft;
   differential means for drivingly connecting said input shaft to said output shaft;
   variable drive means operatively connected to said differential means for varying the speed of rotation of said output shaft independently of said input shaft;
   an auxiliary compressor adapted to receive compressed air from a stage of the compressor of the gas turbine engine, said auxiliary compressor being drivingly connected to said output shaft and being effective to supply compressed air to the auxiliary system at a pressure and flow rate output corresponding to the speed of said output shaft;
   first sensor means for sensing the output of the compressed air supplied from said auxiliary compressor, said first sensor means producing a first signal corresponding to said output;
   signal means for producing a second signal corresponding to the demand for compressed air by the auxiliary system;
   control means for receiving said first signal from said sensor means and said second signal from said signal means, said control means being effective to compare said first signal with said second signal and control said variable drive means to alter the speed of said output shaft and thus vary the output of compressed air supplied by said auxiliary compressor to match the demand for compressed air of the auxiliary system.

6. Apparatus for supplying compressed air to an auxiliary system associated with a device powered by a gas turbine engine having a compressor with a main drive shaft, comprising:
an input shaft and an output shaft;
means adapted to connect to the main drive shaft of the compressor for driving said input shaft in a direction and at a speed corresponding to that of the main drive shaft;
differential means for drivingly connecting said input shaft to said output shaft;
variable drive means operatively connected to said differential means for varying the speed of rotation of said output shaft independently of said input shaft;
speed increaser means operatively connected to said output shaft for providing an output at a speed corresponding to and in excess of that of said output shaft;
an auxiliary compressor adapted to receive compressed air from a stage of said compressor of said gas turbine engine, said auxiliary compressor being drivingly connected to said speed increaser means, said auxiliary compressor being effective to supply compressed air to the auxiliary system of the vehicle at a pressure and flow rate output corresponding to the speed of said output of said speed increaser means;
sensor means for sensing the output of compressed air supplied from said auxiliary compressor, said sensor means producing a signal corresponding to said output;
control means for receiving said signal from said sensor means and controlling said variable drive means to alter the speed of said output shaft and thus the speed of said output of said speed increaser means to vary the pressure of compressed air supplied by said auxiliary compressor in accordance with the demand for compressed air of the auxiliary system during operation.

7. The apparatus of claim 6 in which said speed increaser means comprises:
a first gear mounted to said output shaft;
a pinion gear drivingly engaging said first gear, said pinion gear having a smaller diameter than said first gear;
first and second bevel gears drivingly engaging one another, said first bevel gear being mounted on a first shaft connected to said pinion gear, said second bevel gear being mounted on a second shaft;
a follower gear mounted on said second shaft;
an auxiliary drive shaft connected to said auxiliary compressor;
a driven gear mounted to said auxiliary drive shaft and positioned in engagement with said follower gear, said driven gear having a smaller diameter than said follower gear to rotate said auxiliary drive shaft at a relatively high speed in comparison to said output shaft.

8. The method of supplying compressed air to an auxiliary system associated with a device powered by a gas turbine engine, comprising:
drivingly connecting the main drive shaft of the compressor of the gas turbine engine to an output shaft which drives an auxiliary compressor;
transmitting compressed air into said auxiliary compressor, said auxiliary compressor being operative to discharge compressed air into the auxiliary system at a pressure and flow rate output corresponding to the speed of said output shaft;
sensing the output of the compressed air discharged from said auxiliary compressor and producing a corresponding signal;
transmitting said signal to a controller which controls a variable drive means operatively connected to said output shaft, said controller being effective to control the output of said variable drive means to alter the speed of said output shaft independently of the speed of the main drive shaft and thus vary the output of the compressed air discharged from said auxiliary compressor in accordance with the demand for compressed air of the auxiliary system.

9. The method of supplying compressed air to an auxiliary system associated with a device powered by a gas turbine engine, comprising:
drivingly connecting the main drive shaft of the compressor of the gas turbine engine to an output shaft which drives an auxiliary compressor;
transmitting compressed air from at least one stage of the compressor of the gas turbine engine into said auxiliary compressor, said auxiliary compressor being operative to discharge compressed air into the auxiliary system of the vehicle at a pressure and flow rate output corresponding to the speed of said output shaft;
sensing the output of the compressed air discharged from said auxiliary compressor and producing a corresponding signal;
transmitting said signal to a controller which controls a variable drive means operatively connected to said output shaft, said controller being effective to control the output of said variable drive means to alter the speed of said output shaft independently of the speed of the main drive shaft and thus vary the output of the compressed air discharged from said auxiliary compressor in accordance with the demand for compressed air of the auxiliary system.

10. The method of supplying compressed air to an auxiliary system associated with a device powered by a gas turbine engine, comprising:
drivingly connecting the main drive shaft of the compressor of the gas turbine engine to an output shaft which drives an auxiliary compressor;
transmitting compressed air from at least one stage of the compressor of the gas turbine engine into said auxiliary compressor, said auxiliary compressor being operative to discharge compressed air into the auxiliary system at a pressure and flow rate output corresponding to the speed of said output shaft;
sensing the output of the compressed air discharged from said auxiliary compressor and producing a corresponding first signal;
producing a second signal corresponding to the demand of the auxiliary system for compressed air;
comparing said first signal with said second signal in a controller which controls a variable drive means operatively connected to said output shaft, said controller being effective to control the output of said variable drive means to alter the speed of said output shaft independently of the speed of said main drive shaft and thus vary the output of the compressed air discharged from said auxiliary compressor in accordance with the demand of the auxiliary system for compressed air.

* * * * *